United States Patent [19]
Maeda

[11] Patent Number: 5,813,866
[45] Date of Patent: Sep. 29, 1998

[54] CLOTH CHART FOR LEARNING CHARACTERS

[75] Inventor: Takashi Maeda, Okinawa-ken, Japan

[73] Assignee: Rabbit Co., Ltd., Naha, Japan

[21] Appl. No.: 812,391

[22] Filed: Mar. 5, 1997

[30] Foreign Application Priority Data

Mar. 5, 1996 [JP] Japan ................................ 8-002362 U

[51] Int. Cl.⁶ ................................................. G09B 29/00
[52] U.S. Cl. ............................................ 434/430; 434/159
[58] Field of Search ................................. 434/159, 167,
434/170, 156, 157, 428, 433, 430

[56] References Cited

U.S. PATENT DOCUMENTS

| | | | |
|---|---|---|---|
| 1,506,156 | 8/1924 | Bjorklund-Asperen | 434/429 |
| 2,369,804 | 2/1945 | Schoolfield | 434/167 |
| 4,636,172 | 1/1987 | Fredericks | 434/159 |

OTHER PUBLICATIONS

"Tasteful Shirts", The Washington Star (Newspaper), p. D–2., Jun. 1976.

*Primary Examiner*—Jeffrey A. Smith
*Attorney, Agent, or Firm*—Nakaido, Marmelstein, Murray & Oram LLP

[57] ABSTRACT

A cloth chart for learning characters having the characters indicated on a bed sheet or a lap robe for infants or children, for example, which may be used in sleep or for cold weather. The cloth chart is a sheet of cloth which is formed of at least one or a plurality of sheets of cloth in piles, with the characters indicated on at least one face of the cloth, and pictures with each of pictures respectively located adjacent each of the characters so that a pronunciation of the first letter in the title of a picture corresponds to the reading of the character. At least one of the characters and the pictures is embroidered. A list formed of different colored pieces of cloth is sewed along the circumference of the face on which the characters are arranged.

2 Claims, 4 Drawing Sheets

CLOTH CHART FOR LEARNING CHARACTERS

BACKGROUND OF THE INVENTION AND RELATED ART STATEMENT

This invention relates to a cloth chart for learning characters in which a chart for learning characters is indicated on a bed sheet or a lap robe for child, for example, which may be used in sleep or for cold weather.

A chart of the Japanese syllable or the Roman characters is printed on one face of a cardboard or a resinous sheet with pictures corresponding to these syllable or characters.

For example, in the chart of the Japanese syllable, a picture of duck called "AHIRU" in Japanese is indicated adjacent to the syllable "A". That is, each of the pictures is positioned adjacent each of the corresponding Japanese characters "KANA characters" to the pronunciation of the first letter of its name.

However, these sheets made of paper or resin in which each of the pictures is correspondingly indicated adjacent each of the characters are displayed on a wall in use so as to learning characters by seeing a character and a picture corresponding thereto, therefore, such a way for learning results in limitation of places and methods for learning and further results in difficulty of a natural learning, so that it is not enough to obtain learning effects.

OBJECT AND SUMMARY OF THE INVENTION

Accordingly, it is an object of the present invention to provide a cloth chart for learning characters in which a chart for learning characters is indicated on a cloth cover which is always used in daily life for infants or children, thus assisting learning the characters effectively.

The above object is accomplished by providing a cloth chart for learning characters in which a sheet of cloth which is formed of at least one or a plurality of sheets of cloth in piles, characters indicating portions indicated on at least one face of the cloth where characters for learning are arranged, and pictures indicating portions where each of pictures is respectively located adjacent each of the characters so that a pronunciation of the first letter in the title of a picture corresponds to the reading of the character.

It is possible to indicate the characters and pictures on both faces of the cloth, for example, each Japanese syllable and the Roman characters is respectively indicated on each face of the cloth. It may be arranged to sandwich cotton in the cloth and sew it thereinto for cold weather.

As the chart for learning characters of this invention is arranged to indicate the characters for learning and the pictures corresponding to the reading of each of the characters on one sheets of or a plurality of sheet of cloth in piles, such a cloth is used for the infants or children in sleep or for cold weather, thus it is possible to increase a frequency of use for those who need to learn the characters.

Consequently, they become attached to the chart and they can learn the characters on a bed without moving to the wall on which the chart is displayed as a conventional art, thus increasing learning effects. Further, in a running car, it may be used as protecting against the cold as well as learning the characters, so that it can prevent the feeling of weary in the car. If necessary, it is also possible to use by tacking the chart to a wall.

The above object is accomplished by embroidering at least one of the both indicating portions of the characters and the pictures on the chart. As described above, the characters and pictures for learning are indicated on the base cloth by embroidery, so that the embroidery material is adapted to the cloth with warmness and there is no problem even if it is repeatedly washed.

The above object is accomplished by connecting a plurality of pieces of and various kinds of cloth in color in continuous manner along the circumference of at least one face of the cloth on which the characters are located.

As described above, a plurality of pieces of and various kinds of cloth in color are connected in continuous manner along the circumference of the face on which the chart for learning character or the like is indicated, so that it is more aesthetically pleasing or familiar for the infants or children.

Consequently, it is possible to reduce the feeling of resistance against learning, thus improving the learning effects. Further, it is also possible to make the circumferential portion, which is formed of the different colored pieces in continous manner, by means of a patchwork utilizing small cloth pieces, thus putting cloth pieces to a good use and manufacturing lower cost.

The above object is accomplished by forming a portion for horizontally inserting a rod on at least one face of the cloth, so that it is possible to use the rod as a support.

DETAILED DESCRIPTION OF PREFERRED EMBODIMENTS

Figure 1:
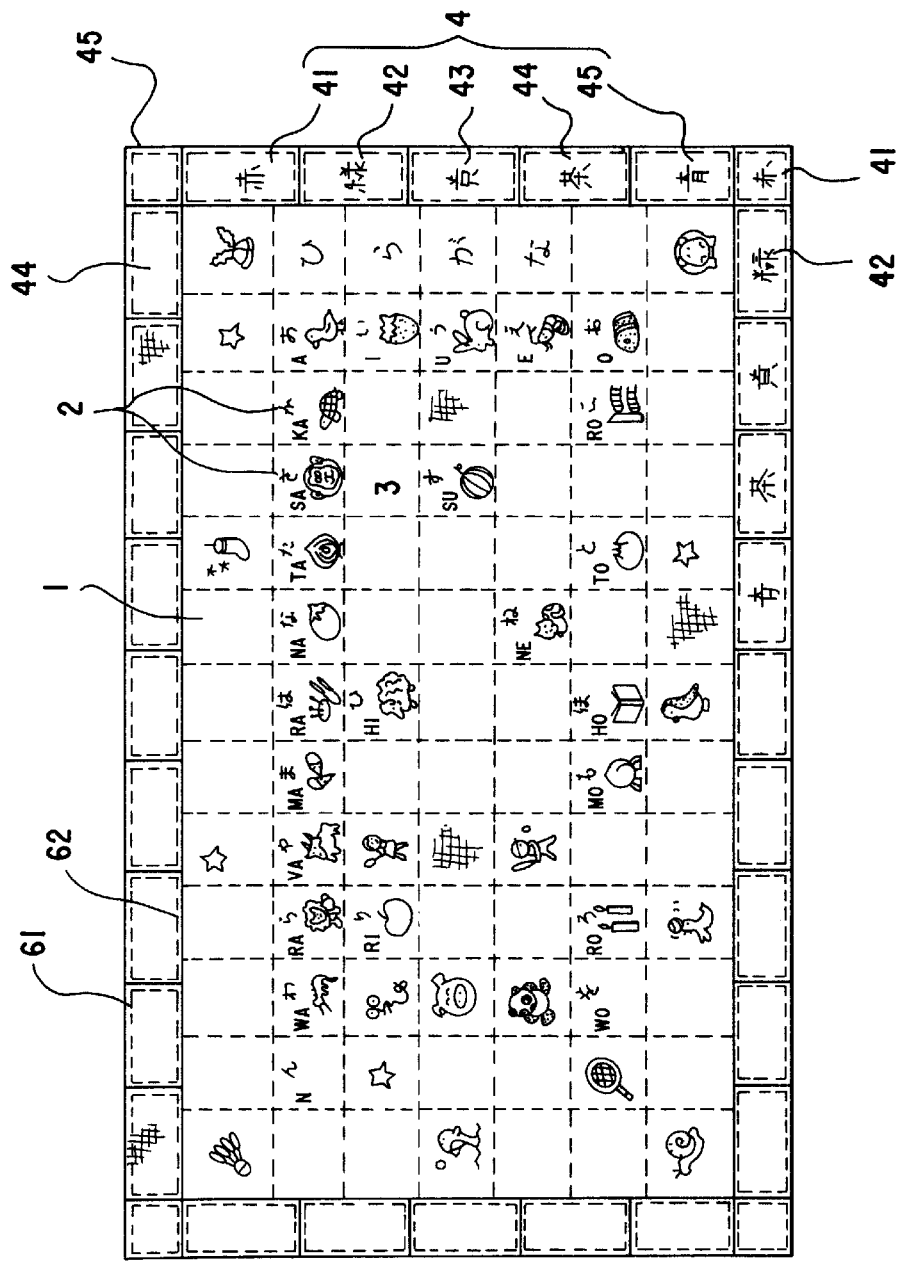
FIG. 1 is a plain view for illustrating a cloth chart for learning characters according to one embodiment of this invention.
Figure 2:
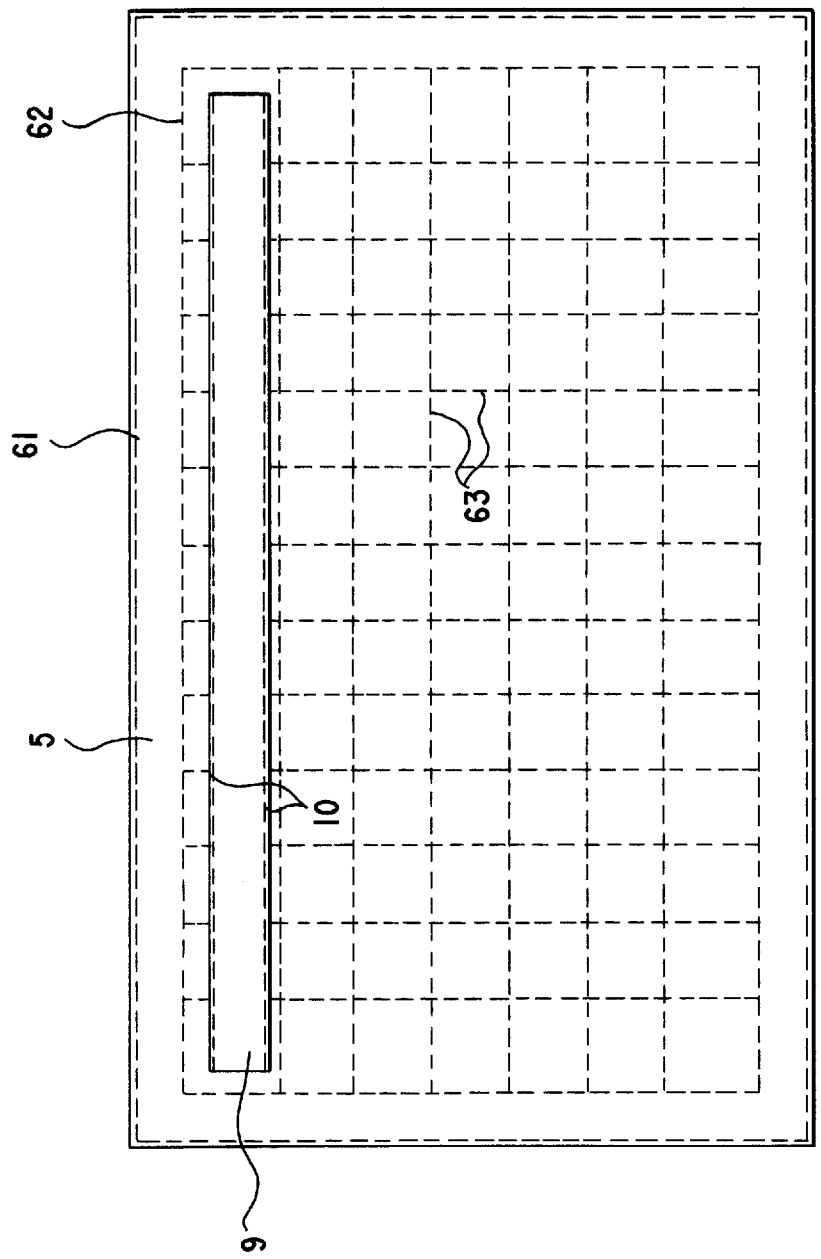
FIG. 2 is a rear view of the cloth chart for learning characters shown in FIG. 1.

Referring to the drawings, several embodiments of the invention will now be described. FIG. 1 shows a plain view of a cloth chart for learning characters according to this invention as an example for learning Japanese syllables. FIG. 2 is a rear view of the above cloth chart for learning characters.

Referring to FIG. 1, a plurality of characters 2 . . . for learning are indicated with an arrangement of Japanese syllables on a surface 1 of a sheet of cloth. Adjacent each of the characters 2, each of pictures 3 corresponding to each of the characters 2 is indicated. For example, in the case of a character "A", a picture 3 of "AHIRU(a duck)" is indicated adjacent the character.

As described above, adjacent the characters of the Japanese syllable chart, the pictures 3 corresponding to each of the characters are indicated. That is, the pictures are indicated where the pronunciation of the first letter of the title of the picture corresponds to the reading or pronunciation of each character in the Japanese syllable chart.

These characters and pictures are embroidered onto the cloth. Consequently, as these characters and pictures are indicated by threads, such indicating portions become identical with the cloth 1 in material, so that these portions do not degrade in washing.

A plurality of pieces of cloth 41, 42, . . . which are of various colors are connected in continuous manner to the circumference of the face of the cloth on which the characters and pictures are indicated. For example, the pieces 41, 42, 43, 44, 45 are respectively red, green, yellow, brown and blue. A list 4 composed of these five colored pieces which are sewed together in order is sewed and connected along the circumference of the indicating area 1 of the characters and pictures.

As shown in FIG. 2, a plain sheet 5 of cloth is piled on the rear side of the cloth 1 connected with the list 4 and it is sewed together with each other along circumferential portions 61, 62. The remainder is sewed crosswise like a quilt as shown by a broken line 63.

Further, it may be arranged to sandwich another sheet of cloth or cotton between the cloths 1 and 5. It also may be arranged to use only one sheet of the indicating side cloth 1 without the rear side cloth 5. However, in this case, the rear face of the cloth 1 is naked as it is as well as the rear face of the embroidery, so that it is preferred to attach the rear cloth 5 for covering the naked rear face.

The purpose of the character learning can be achieved even if only the indicating area 1 is used for learning. Accordingly, the list 4 composed of the different colored pieces 41, 42, . . . adjacent each other is not required essentially. However, it is preferred to attach the list 4 so as to attract infants or children since they seems to consider it pleasing.

A strip 9 of cloth is horizontally sewed at its upper and lower ends 10 on the upper side of the rear cloth 5 so as to enable a rod to be horizontally inserted therethrough. When the rod is inserted and passed through between the strip cloth 9 and the rear cloth 5, the chart, is supported horizontally. In this manner, it is possible to use such a cloth chart for learning characters hanging on a wall or the like. Further, it is also used for decoration or as a curtain.

Figure 3:
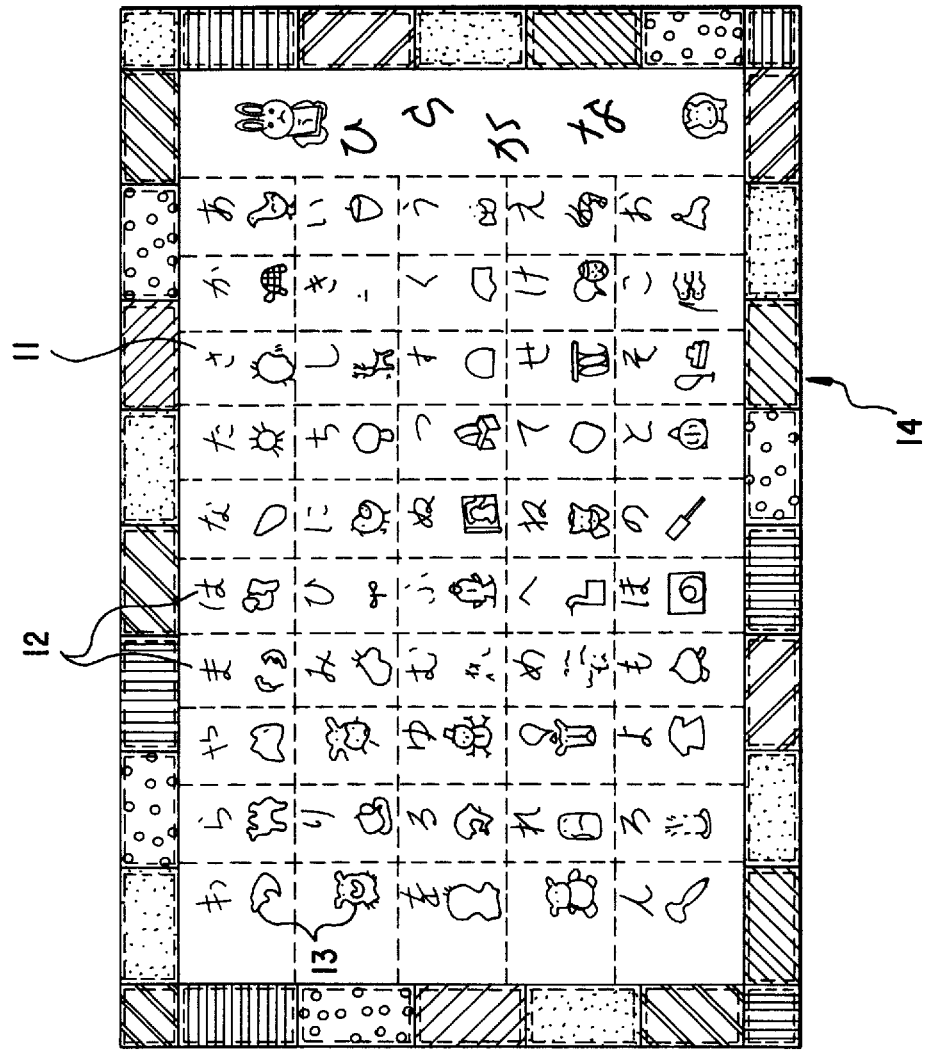
FIG. 3 is a plain view showing a surface side of a cloth chart for learning characters for the Japanese syllables.

FIG. 3 is a plain view of a cloth chart for learning characters of Japanese syllables. This embodiment shows only a combination of the Japanese characters HIRAGANA 12 and pictures 13 in the indicating area 11. However, it is possible to indicate three elements, the Japanese characters HIRAGANA, the pictures and the Roman characters corresponding to same pronunciation as the reading of the Japanese characters as shown in FIG. 1. It may indicate Japanese characters KATAKANA together with or instead of the Japanese characters HIRAGANA. Border pieces 14 can be used.

Figure 4:
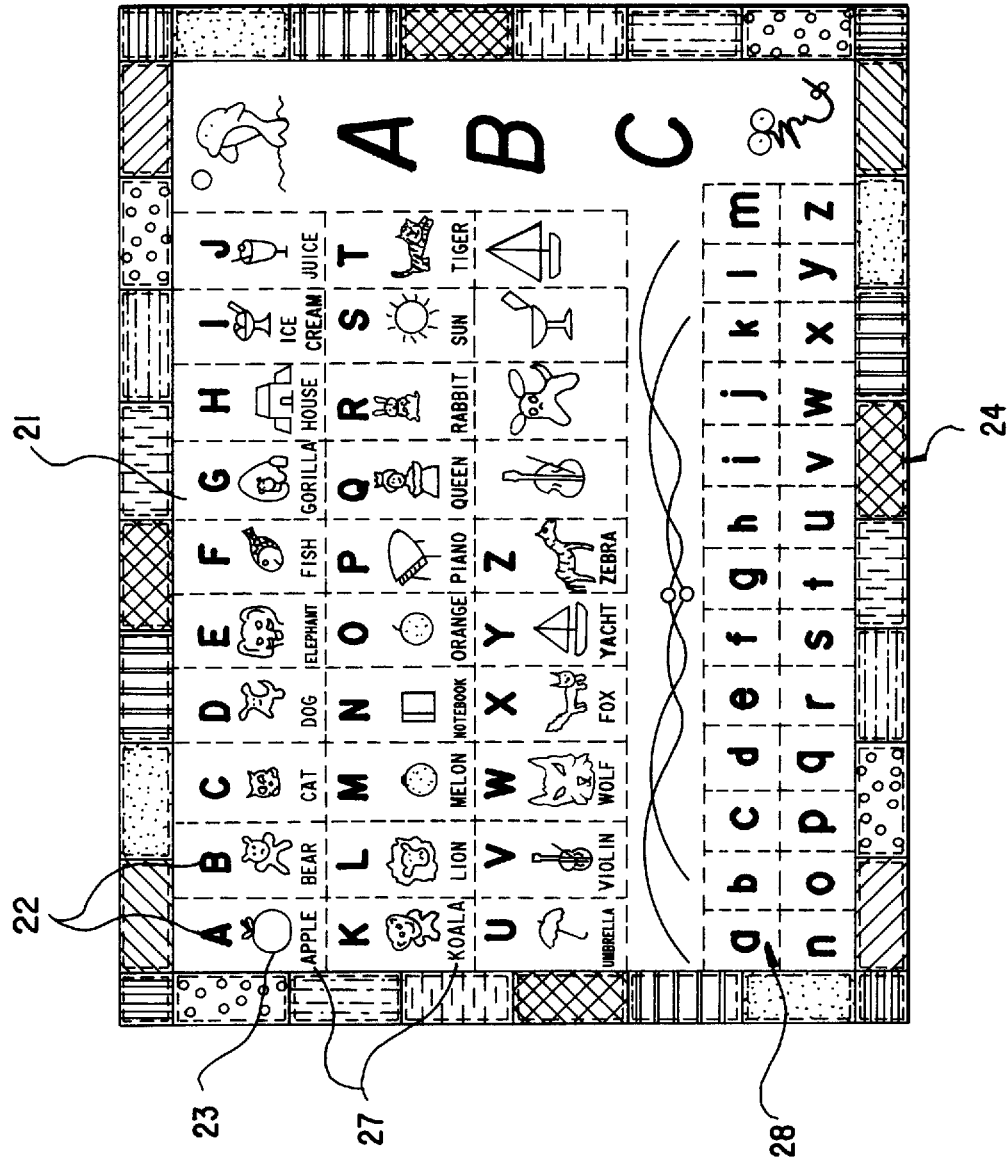
FIG. 4 is a plain view showing a surface side of a cloth chart for learning characters for the Roman characters.

Referring to FIG. 4, the Roman characters 22 are indicated and arranged in relationship with each other in order, and pictures 23 in which the reading of the first letter of its title corresponds to the pronunciation of each of the Roman characters are indicated adjacent each of the Roman characters in the indicating area 21. Spellings 27 corresponding to each of the pictures 23 are also indicated.

FIG. 4 shows capital letters as the Roman characters 22. However, it is also possible to indicate small letters 28 together with or instead of the capital letters. Further, it may indicate only the capital letters 22 adjacent the pictures 23 while indicating the small letters 28 on the other area in order. Border pieces 24 may be used.

As the chart for learning characters of this invention is arranged to indicate the characters for learning and the pictures corresponding to the reading of each of the characters on one sheet of or a plurality of sheet of cloth in piles, such a cloth is used for the infants or children in sleep or for cold weather, thus it is possible to increase a frequency of use for the ones who need to learn the characters.

The infants or children can have an opportunity much more to see it, thus having the effect of learning. Consequently, they can learn the characters on a bed without moving to a wall on which the chart is displayed. Further, in a running car, it may be used as protecting against the cold as well as learning the characters, so that it can prevent the feeling of weary in the car.

When wheeling an infant in a buggy like as shopping together with such a cloth chart for learning characters, it does not occur the feeling of weary for the infant by seeing pictures which are designed for children. When the infant is sleeping, it is possible to cover the child with the chart as a blanket for protecting against catching a cold.

According to this invention, the characters and pictures for learning are indicated on the base cloth by embroidery, so that the embroidery material is adapted to the cloth with warmness and there is no problem even if it is repeatedly washed.

According to this invention, a plurality of pieces of and various kinds of cloth in color are connected in continuous manner along the circumference of the face on which the chart for learning character or the like is indicated, so that it forms feelings to be beautiful or familiar with for the infants or children. Consequently, it is possible to reduce the feeling of resistance against learning, thus improving the learning effects. Further, it is also possible to make the circumferential portion, which is formed of the different colored pieces in continous manner, by means of a patchwork utilizing small cloth pieces, thus putting cloth pieces to a good use and manufacturing lower cost.

According to this invention, a portion for horizontally inserting a rod is formed on the upper side of at least one face of the cloth, so that it is possible to hang it on a wall for learning.

Although the present invention has been described in connection with a preferred embodiment thereof, many variations and modifications will now become apparent to those skilled in the art. It is preferred, therefore, that the present invention be limited not by the specific disclosure herein, but only by the appended claims.

What is claimed is:

1. A cloth chart for learning characters comprising a cloth comprising at least one sheet of cloth in piles, characters indicating portions indicated on at least one face of the cloth where a plurality of characters for learning are arranged, picture indicating portions where one of a plurality of pictures is respectively located adjacent each of the characters so that a pronunciation of a first letter in a title of said one picture corresponds to a reading of the character, at least one of said character indicating portions and said picture indicating portions being embroidered on said at least one sheet, a plurality of pieces of and various kinds of cloth in color connected in continuous manner along a circumference of said at least one face of the cloth, and a portion for horizontally inserting a rod formed on the upper side of a face opposite said at least one face of the cloth.

2. The cloth chart according to claim 1, wherein the character indicating portions and the picture indicating portions are permanently affixed to said at least one sheet and said cloth comprises at least two sheets of cloth attached in piles.

* * * * *